United States Patent
Yahata et al.

(10) Patent No.: US 10,504,212 B2
(45) Date of Patent: Dec. 10, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Kazuhiro Yahata, Kunitachi (JP); Yoshitaka Sasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/652,896

(22) Filed: Jul. 18, 2017

(65) Prior Publication Data

US 2017/0316550 A1    Nov. 2, 2017

Related U.S. Application Data

(60) Continuation of application No. 15/174,325, filed on Jun. 6, 2016, now Pat. No. 9,747,671, which is a
(Continued)

(30) Foreign Application Priority Data

Feb. 14, 2013 (JP) .................................. 2013-026870
Jan. 16, 2014 (JP) .................................. 2014-005924

(51) Int. Cl.
*G06T 5/00* (2006.01)
*G06T 5/20* (2006.01)
*G06K 9/62* (2006.01)

(52) U.S. Cl.
CPC ............ *G06T 5/002* (2013.01); *G06K 9/6202* (2013.01); *G06K 9/6215* (2013.01); *G06T 5/20* (2013.01);
(Continued)

(58) Field of Classification Search
None
See application file for complete search history.

(56) References Cited

U.S. PATENT DOCUMENTS 7,054,501 B1    5/2006    Gindele et al.
7,127,122 B2   10/2006    Ogata et al.
(Continued)

FOREIGN PATENT DOCUMENTS

JP    2011114642 A    6/2011

OTHER PUBLICATIONS

Japanese Office Action for application No. 2014-005924 dated Oct. 3, 2017 with English translation (8 pages).
(Continued)

*Primary Examiner* — Andrae S Allison
(74) *Attorney, Agent, or Firm* — Carter, DeLuca & Farrell LLP

(57) ABSTRACT

A non-local means method is insufficient in its noise reduction effect or edge retainability due to a perfect match between blocks in a case where a reference pixel matches a target pixel. Therefore, information on a target region and plural reference regions is obtained for the target pixel. Whether the target region matches any one of the reference regions is determined from the obtained information. Switching between weight derivation methods based on similarity between the target region and the reference region is performed according to a determined result.

9 Claims, 12 Drawing Sheets

Related U.S. Application Data division of application No. 14/173,198, filed on Feb. 5, 2014, now Pat. No. 9,384,531.

(52) U.S. Cl.
CPC ............ *G06T 2207/20012* (2013.01); *G06T 2207/20192* (2013.01)

(56) References Cited

U.S. PATENT DOCUMENTS

| | | | |
|---|---|---|---|
| 7,570,833 B2 | 8/2009 | Lee | |
| 7,974,473 B2 | 7/2011 | Nanbu | |
| 8,928,813 B2* | 1/2015 | Liu | H04N 5/213 348/609 |
| 9,384,531 B2* | 7/2016 | Yahata | G06T 5/002 |
| 9,569,682 B2 | 2/2017 | Yahata et al. | |
| 9,818,176 B2* | 11/2017 | Sasaki | G06T 5/002 |
| 2004/0225218 A1* | 11/2004 | Guracar | G01S 7/52085 600/443 |
| 2005/0259886 A1* | 11/2005 | Shan | G06T 5/002 382/260 |
| 2008/0025644 A1* | 1/2008 | Ou | G06T 3/4007 382/298 |
| 2009/0052798 A1 | 2/2009 | Kwon et al. | |
| 2009/0087121 A1* | 4/2009 | Han | G06T 5/002 382/266 |
| 2010/0034296 A1* | 2/2010 | Cunha | H04N 19/80 375/240.29 |
| 2010/0284596 A1* | 11/2010 | Miao | G06T 11/005 382/131 |
| 2011/0069886 A1 | 3/2011 | Chien et al. | |
| 2011/0069902 A1* | 3/2011 | Yang | G06T 5/002 382/260 |
| 2011/0069904 A1* | 3/2011 | Yang | G06T 5/002 382/275 |
| 2011/0081096 A1 | 4/2011 | Kim | |
| 2011/0097008 A1* | 4/2011 | Cao | G06T 3/4015 382/260 |
| 2011/0142368 A1* | 6/2011 | Shin | G06T 5/002 382/275 |
| 2011/0268368 A1* | 11/2011 | Toyoda | G06T 5/002 382/264 |
| 2012/0057765 A1* | 3/2012 | El-Zehiry | G06T 5/002 382/128 |
| 2012/0099008 A1 | 4/2012 | Horikawa et al. | |
| 2012/0281923 A1 | 11/2012 | Irani et al. | |
| 2014/0003495 A1 | 1/2014 | Chuang et al. | |
| 2014/0003735 A1* | 1/2014 | Artyomov | G06T 5/002 382/275 |
| 2014/0064615 A1* | 3/2014 | Ren | G06T 5/002 382/168 |
| 2014/0226905 A1* | 8/2014 | Yahata | G06T 5/002 382/194 |
| 2014/0240556 A1 | 8/2014 | Yahata et al. | |
| 2014/0355901 A1* | 12/2014 | Tezaur | G06T 5/003 382/255 |
| 2016/0284065 A1* | 9/2016 | Cohen | G06T 5/10 |

OTHER PUBLICATIONS

Wang et al. "Fast Non-Local Algorithm for Image Denoising," 2006 International Conference on Image Processing, IEEE, 2006.

Buades et al. "A Non-Local Algorithm for Image Denoising," 2005 IEEE Computer Society Conference on Computer Vision and Pattern Recognition (CVPR'05), vol. 2, pp. 60-65, 2005.

Tomasi et al, "Bilateral Filtering for Gray and Color Images," Proc. IEEE Int. Conf. on Computer Vision, 836-846, 1998.

Efros et al. "Texture Synthesis by Non-Parametric Sampling," IEEE International Conference on Computer Vision, pp. 1-6, Sep. 1999.

Efros et el., Texture Synthesis by Non-parametric Sampling . . . IEEE International Conference on Computer Vision, Corfu, Greece, Sep. 1999, (6 pages).

\* cited by examiner

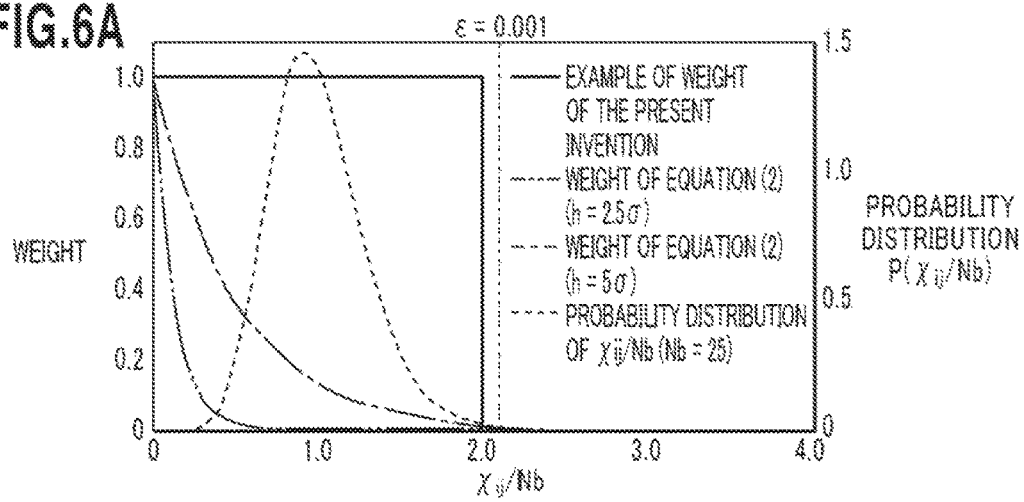
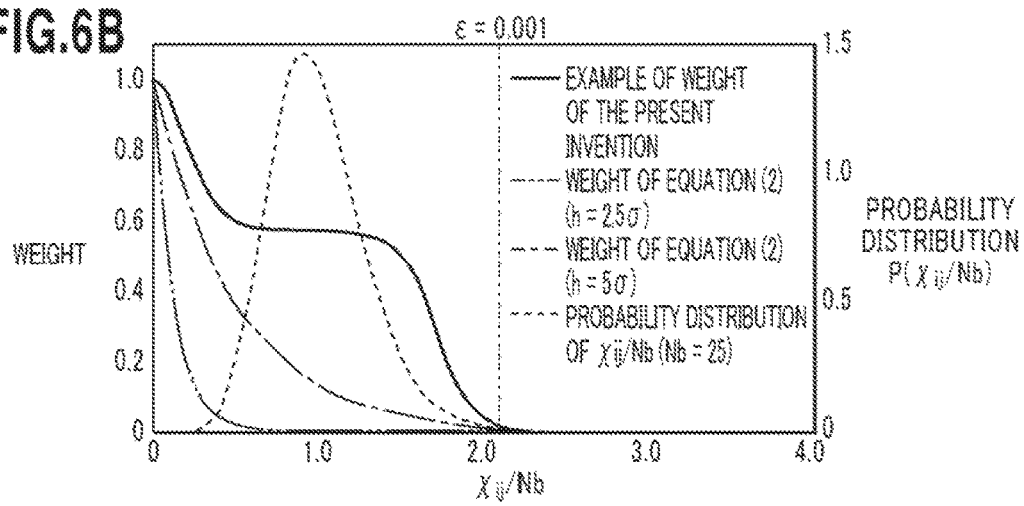
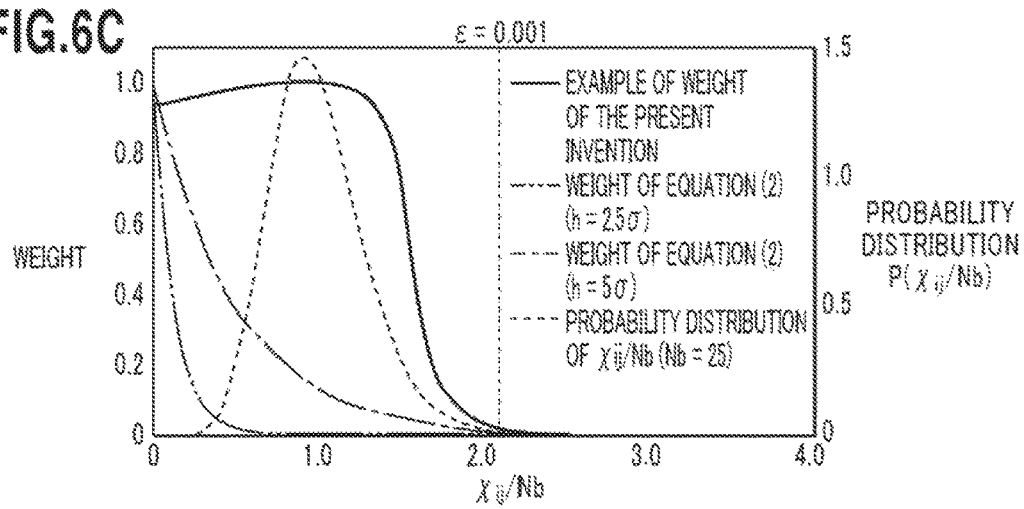

IMAGE PROCESSING APPARATUS, IMAGE PROCESSING METHOD, AND STORAGE MEDIUM

CROSS REFERENCE TO RELATED APPLICATIONS

This application is a continuation of U.S. patent application Ser. No. 15/174,325, filed on Jun. 6, 2016, which is a divisional of U.S. patent application Ser. No. 14/173,198, filed on Feb. 5, 2014, now U.S. Pat. No. 9,384,531, which claims the benefit of and priority to Japanese Patent Application Nos. 2013-026870, filed on Feb. 14, 2013, and 2014-005924, filed on Jan. 16, 2014, the disclosures of each of which are hereby incorporated by reference herein in their entirety.

BACKGROUND OF THE INVENTION

Field of the Invention

The present invention relates to an image processing apparatus, an image processing method and a storage medium for reducing noise in image data of a captured image.

Description of the Related Art

There is a demand that a camera have higher sensitivity than hitherto in order to capture an image of a darker scene or a faster object. However, an increase in the sensitivity of the camera causes an increase in noise, and therefore, noise reduction processing for more greatly reducing the noise becomes necessary. Simple noise reduction processing causes a deterioration in resolution, and therefore, a technology for reducing noise while retaining an edge or a texture is necessary. A general approach for such a noise reduction technology of retaining the edge involves determining similarity between a target pixel to be reduced in noise and a reference pixel around the target pixel, determining a weight according to the similarity, and calculating a weighted mean, thereby reducing noise. For example, a technology called bilateral filtering determines a weight according to the similarity calculated based on a difference in pixel value between the target pixel and the reference pixel and a distance between the target pixel and the reference pixel on an image. (Refer to "Bilateral Filtering for Gray and Color Images," Proc. IEEE Int. Conf. on Computer Version, pp. 836-846 (1998).) Also, a technology called a non-local means method known as noise reduction processing with higher accuracy uses block matching to calculate the similarity between the target pixel and the reference pixel. (Refer to "A non-local algorithm for image denoising," IEEE Computer Vision and Pattern Recognition, 2005, Vol. 2, pp. 60-65 (2005).)

However, the non-local means method has an insufficient noise reduction effect due to the fact that a complete block match occurs in a case where the same region as that for a target pixel is set as for a reference pixel.

SUMMARY OF THE INVENTION

According to one aspect of the present invention, there is provided an image processing apparatus for determining a pixel value of a target pixel by a weighted mean of plural reference pixels in image data, including: a derivation unit configured to derive a weight for each of the reference pixels, based on similarity between a target region associated with the target pixel and a reference region associated with the reference pixels; and a weighted mean processing unit configured to perform weighted mean processing based on pixel values of the plural reference pixels and the weights corresponding to the reference pixels, respectively, derived by the derivation unit, in which the weighted mean processing unit performs the weighted mean processing by using a pixel other than the target pixel as the reference pixel.

Further features of the present invention will become apparent from the following description of exemplary embodiments (with reference to the attached drawings).

BRIEF DESCRIPTION OF THE DRAWINGS

FIGS. 6A to 6C illustrate examples of functions for transforming similarity into a weight, used in a second embodiment;

DESCRIPTION OF THE EMBODIMENTS

Embodiments of the present invention will be described below with reference to the drawings. Incidentally, it is to be understood that configurations of the following embodiments are illustrative only, and the present invention is not limited to illustrated configurations.

First Embodiment

A configuration of an image processing apparatus according to a first embodiment will be described with reference to FIG. 1.

Figure 1:
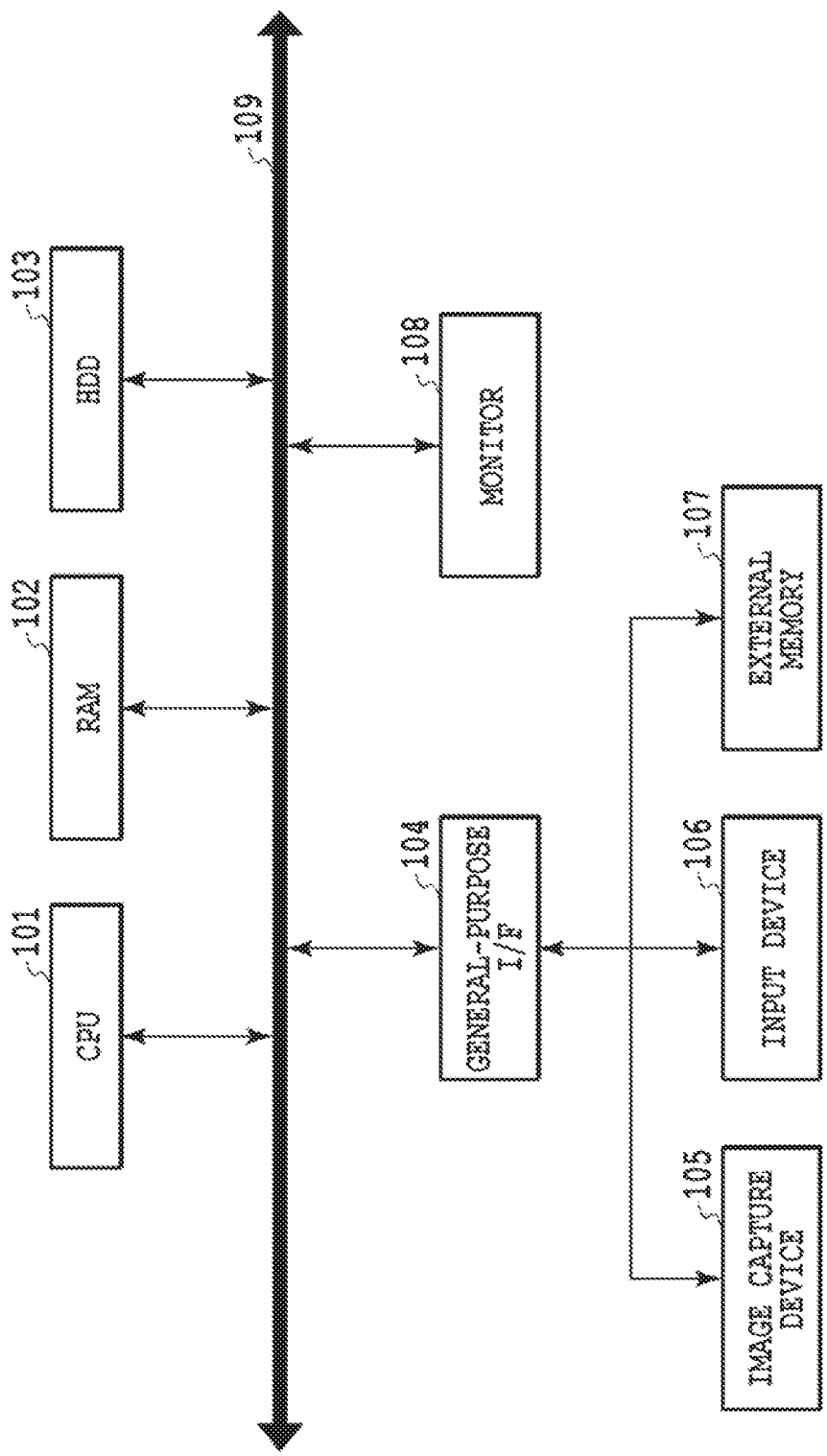
FIG. 1 is a block diagram illustrating a configuration of an image processing apparatus.

In FIG. 1, the image processing apparatus includes a CPU (central processing unit) 101, RAM (random access memory) 102, an HDD (hard disk drive) 103, a general-purpose interface (I/F) 104, a monitor 108, and a main bus 109. The general-purpose I/F connects to an image capture device 105 such as a camera, an input device 106 such as a mouse or a keyboard, and an external memory 107 such as a memory card to the main bus 109.

Description will be given below with regard to various types of processing implemented by the CPU 101 executing various pieces of software (or computer programs) stored in the HDD 103.

First, the CPU 101 starts an image processing application stored in the HDD 103, and loads the image processing application into the RAM 102 and displays a user interface (UI) on the monitor 108. Then, various data stored in the HDD 103 or the external memory 107, image data captured by the image capture device 105, a command from the input device 106, and the like are transferred to the RAM 102. Further, various operations are performed on data stored in the RAM 102 based on a command from the CPU 101 in accordance with processing in the image processing application. Results of the operations are displayed on the monitor 108 or stored in the HDD 103 or the external memory 107.

Description will be given with regard to details of processing in the above-described configuration, in which image data as a target of noise reduction is inputted to the image processing application to perform noise reduction processing. Firstly, description will be given with regard to processing by a non-local means method as the conventional technology. After that, mention will be made of a problem involved in processing in a case where a reference pixel matches a target pixel, noted in the first embodiment. Then, description will be given with regard to an approach for solving the problem.

Description of Non-Local Means Method

Image data of a captured image contains a signal component as an original value without noise, and a noise component added to the signal component. Ideal noise reduction processing is to calculate a mean of pixel values of pixels having the same signal component. Thereby, image data, in which the noise component is reduced due to a reduction of standard deviation of the noise component while the signal component is remained as it is, is obtained. However, the image data obtained by the image capture has noise, and therefore, which pixels have the same original signal component cannot be accurately seen. However, processing close to the calculation of the mean of the pixel values of the pixels having the same signal component can be accomplished by selecting a likely pixel based on some similarity and calculating a mean, or by assigning a weight to the calculation of the mean according to the similarity. Therefore, processing for calculating a weighted mean is a general form of the noise reduction processing in image processing. Hereinafter, a pixel of interest to be reduced in noise will be called a target pixel, and plural pixels to be used for mean calculation will be called reference pixels. At this time, an equation for the weighted mean is as follows.

$$I_{i,new} = \sum_{j}^{Nr} w_{ij} I_j \Big/ \sum_{j}^{Nr} w_{ij} \qquad (1)$$

Figure 2:
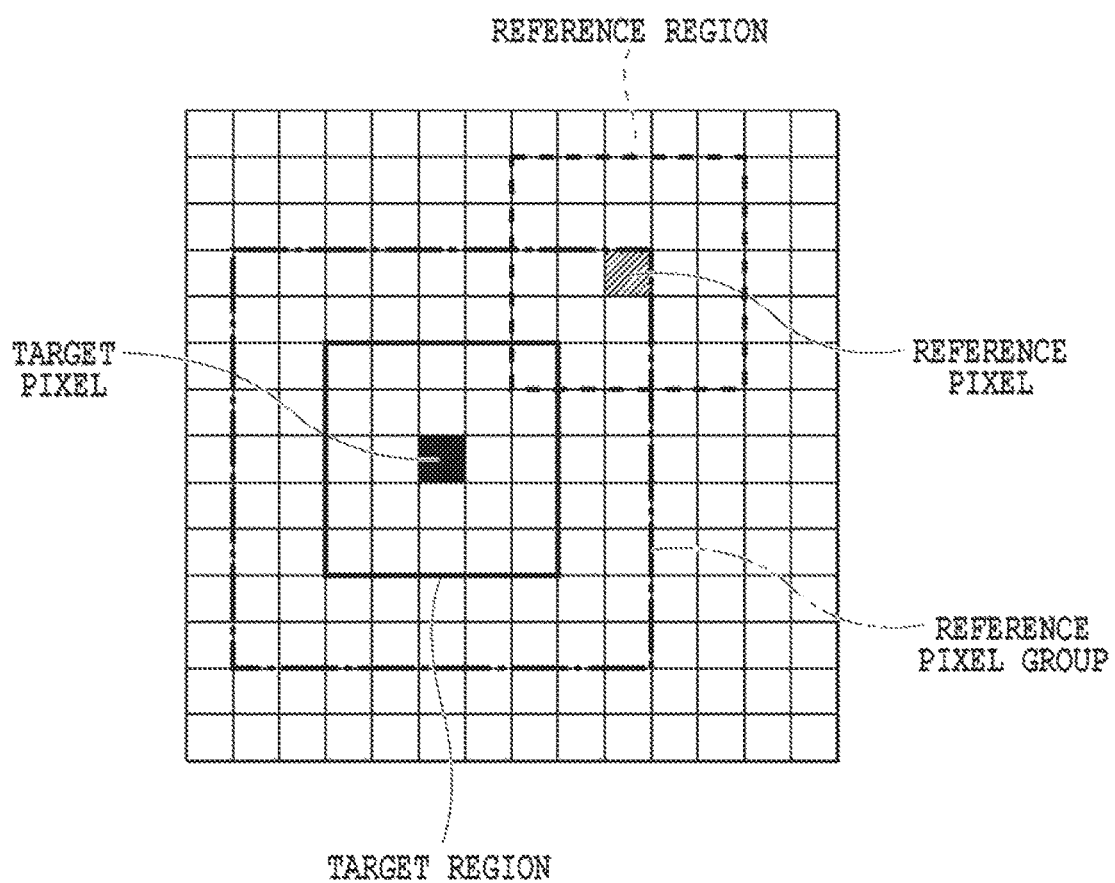
FIG. 2 is a representation of assistance in explaining relationships among a target pixel, a target region, a reference pixel, and a reference region.

Here, Nr denotes the number of reference pixels. $I_{i,new}$ in the left side denotes the pixel value of the ith target pixel after the noise reduction processing. Σ means calculation of the sum of Nr summands, $w_{ij} I_j$ or $w_{ij}$, where j are indices j which identify plural reference pixels, $I_j$ denotes the pixel value of the jth reference pixel, and $w_{ij}$ denotes the weight of the jth reference pixel for the ith target pixel. A denominator is used for normalization such that the sum of weights becomes equal to 1. The non-local means method adopts block matching for calculation of the similarity between the target pixel and the reference pixel. Specifically, as illustrated in FIG. 2, a region around the target pixel is first defined as a target region, and likewise, a region around each reference pixel is defined as a reference region. At this time, it is not necessarily required that the target region contain the target pixel, and it is not necessarily required that each reference region contain each reference pixel. Regions having the same size are prepared for the target region and the reference region. Then, a square of a difference between each pixel which forms the target region and each pixel which forms the reference region corresponding to each pixel of the target region is calculated. The sum of the squares of the difference is calculated for all pixels which form the target region. The sum of the squares of the difference is an index of the similarity between the target pixel and the reference pixel. The similarity is higher as the sum of the squares of the difference is closer to 0, while on the other hand, the similarity is lower as the sum of the squares of the difference is larger. Then, the sum of the squares of the difference is transformed into the weight $w_{ij}$. An equation for transformation is as follows.

$$w_{ij} = \exp\left(-\frac{\sum_{k}^{N_b} \alpha_k (I_{ik} - I_{jk})^2}{h^2}\right) \qquad (2)$$

$I_{ik}$ denotes the pixel value of the kth pixel which forms the target region, and $I_{jk}$ denotes the pixel value of the kth pixel which forms the jth reference region. $\alpha_k$ denotes a constant having a value determined for the kth pixel of the target region. $N_b$ denotes the number of pixels which form the target region (hereinafter called the number of target region pixels). Incidentally, the number of pixels which form the reference region is the same as the number of target region pixels. h denotes a parameter, which has the role of adjusting the intensity of noise reduction. Incidentally, the name "non-local means" is given because a range of the reference pixels is set throughout the entire image, not in a local region of the image. However, it is not essential for noise reduction that the range of the reference pixels be set throughout the entire image, and a noise reduction effect is obtained even if the reference pixels are limited to the local region of the image. Also, the range as the reference pixels contains the target pixel because it is natural that a value after the noise reduction processing reflects the value of the target pixel itself. The conventional technology performs processing according to the above equation, even in a case where the reference pixel matches the target pixel.

Problems Inherent in Non-Local Means Method

Next, description will be given with regard to problems of the non-local means method to be solved by the first embodiment. As mentioned above, the non-local means method uses the block matching between a target region and a reference region to calculate the similarity between the target pixel in the target region and the reference pixel in the reference region. This is based on the assumption that the signal component of the target pixel is the same as the signal component of the reference pixel in a case where the pixel value of each of pixels in the target region is almost the same as the pixel value of each of pixels in the reference region.

However, even in a case where the signal component of the target region is the same as the signal component of a certain reference region A, a situation where the pixel value of each of pixels in the target region is almost the same as the pixel value of each of pixels in the reference region is statistically rare. For example, even in a case of a smooth region where the signal components of pixels in the target region and the signal components of pixels in the reference region A are the same color, the similarity between the target region and the reference region A is not so high due to a noise component. Meanwhile, in a case where a reference region B which is the same region as the target region (or equivalently, the target region itself) is used as the reference region, the same region is used to compares pixels, and thus, the pixel values of pixels in the target region and the pixel values of pixels in the reference region B completely match each other. The non-local means method assigns a high weight to reference pixels which form a reference region having high similarity, and thus, an extremely high weight is assigned to a reference pixel B' (or equivalently, the target pixel itself) which forms the reference region B. Meanwhile, although a reference pixel A' which forms the reference region A having the same signal component has relatively high similarity, the reference pixel A' is given a lower weight, as compared to the reference pixel B' (or equivalently, the target pixel itself) which forms the reference region B. After all, the weight of the pixel of the target pixel itself is relatively higher than the weight of other reference pixels, and thus, a sufficient noise reduction effect cannot be achieved.

The contents of the above description will be described in more detail. Firstly, description will be given with regard to statistical behavior of the sum of the squares of the difference in a case where pixels of a target region and pixels of a reference region are identical in signal component. The sum of the squares of the difference is used as similarity between the target region and the reference region, and corresponds to a weight for reference pixels which form the reference region. Incidentally, the presence or absence of $\alpha_k$ is not involved in the essence of a problem to be described below. Hereinafter, therefore, $\alpha_k$ is all assumed to be 1 in order to facilitate description.

First, the signal component of the target region is represented as $S_{ik}$, and the noise component thereof is represented as $N_{ik}$. The pixel value $I_{ik}$ of kth pixel in the target region is the sum of the signal component $S_{ik}$ and the noise component $N_{ik}$. Likewise, the signal component of the jth reference region is represented as $S_{jk}$, and the noise component thereof is represented as $N_{jk}$. In a case where the signal component of the target region is the same as the signal component of the reference region ($S_{ik}=S_{jk}$), the sum of the squares of the difference $D_{ij}$ is the sum of the squares of the difference between the noise components.

$$D_{ij} = \sum_{k}^{N_b} (I_{ik} - I_{jk})^2 = \sum_{k}^{N_b} (N_{ik} - N_{jk})^2 \quad (3)$$

The sum of the squares of the difference $D_{ij}$ in the case of the same signal component as described above, or equivalently, the sum of the squares of the difference between the noise components, is 0 in a case where the target region and the reference region are set as the same region. However, in a general case, or equivalently, in a case where the target region and the reference region are not set as the same region, a probability that the sum of the squares of the difference between the noise components is 0 is rare. Description will be given below.

Assuming that a noise distribution is a Gaussian distribution and a standard deviation is $\sigma$, it is known that an amount $\chi_{ij}$ obtained by dividing the sum of the squares of the difference $D_{ij}$ by double a noise variance $\sigma^2$ follows a chi ($\chi$) square distribution, the degree of freedom of which is the number $N_b$ of target region pixels. A $\chi$ square distribution $P(x|N_b)$ is expressed by Equation (4).

$$P(x \mid N_b) = \frac{x^{[N_b/2]-1} \exp(-x/2)}{2^{N_b/2} \Gamma(N_b/2)} \quad (4)$$

Figure 3:
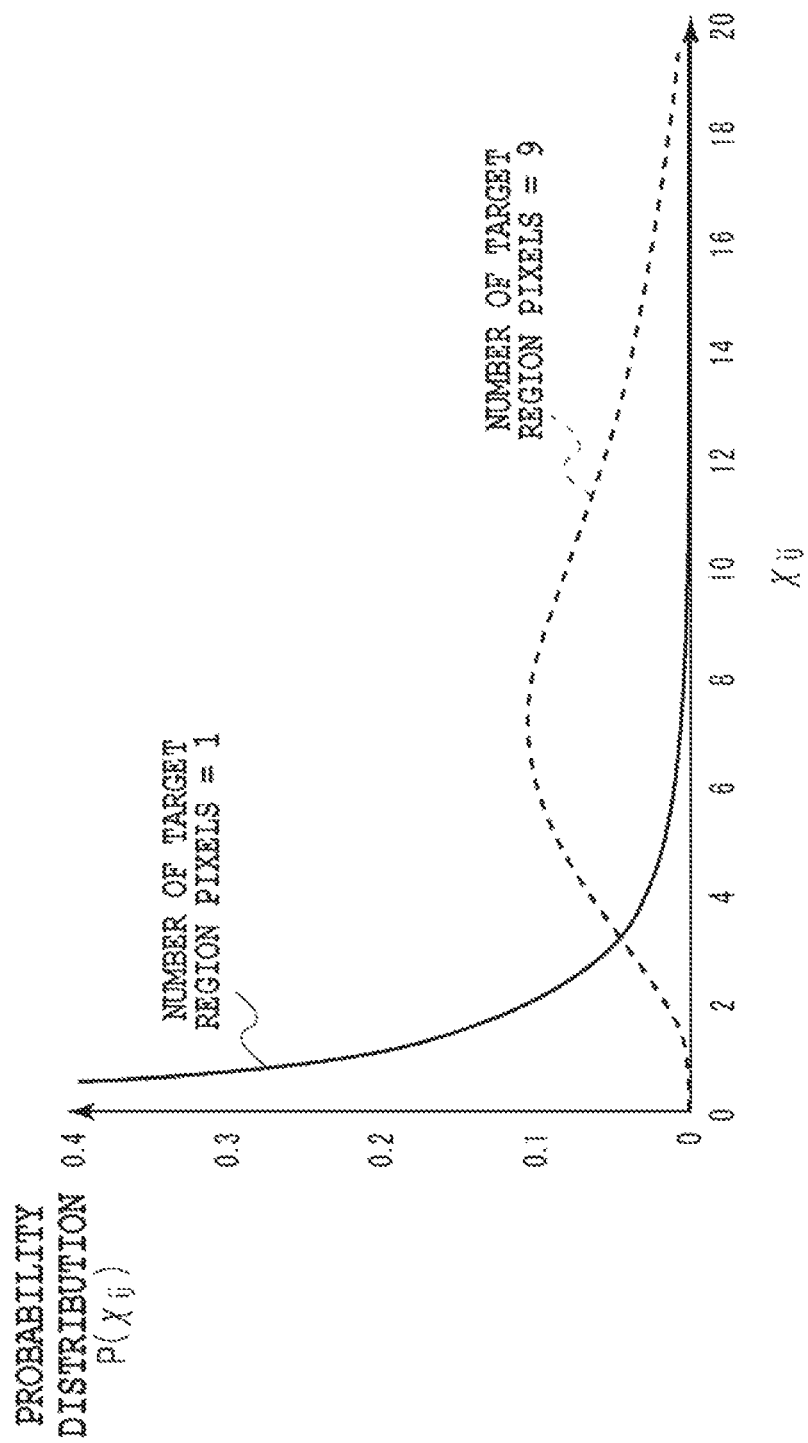
FIG. 3 is a graph illustrating an example of a probability distribution followed by a value obtained by dividing the sum of squares of a difference between the target region and the reference region by double a noise variance.

FIG. 3 illustrates the outlines of the chi square distributions in a case where the number $N_b$ of target region pixels is 1 and in a case where the number $N_b$ of target region pixels is 9. As illustrated in FIG. 3, in a case where the number $N_b$ of target region pixels is 1, the likeliest value, or equivalently, the most frequent value, of the sum of the squares of the difference, is 0; however, in a case where the number $N_b$ of target region pixels is 9, the most frequent value is 7, and an event in which the sum of the squares of the difference is 0 is a rare phenomenon. In the chi square distribution, an event in which the sum of the squares of the difference is 0 is a rarer phenomenon as the number $N_b$ of target region pixels as the degree of freedom increases. Incidentally, a tendency that the event in which the sum of the squares of the difference is 0 is rarer as the number $N_b$ of target region pixels increases substantially holds also for a noise distribution other than the Gaussian distribution. This is a dimensional effect, and is due to the fact that a probability that plural pairs of pixels have the same value at the same time decreases exponentially with respect to the number of pixels as the number of pairs of pixels for difference calculation increases. In other words, this indicates that, in the case of the target pixel and the reference pixel having the same signal component, a match between the noise component of the target region and the noise component of the reference region is rare. Meanwhile, in the conventional non-local means method, in a case where the signal component of the target pixel matches the signal component of the reference pixel, a phenomenon which is to be a rare phenomenon in which the noise components also match each other always occurs. One concept of the first embodiment is that a weight for such an inherently rare phenomenon (or an event in which the noise component of the target region matches the noise component of the reference region) is brought close to a probable weight.

Now, in the conventional non-local means method, in a case where the reference region and the target region are set as the same region, the sum of the squares of the difference $D_{ij}$ is always 0. Thus, in a case where the target pixel itself is set as the reference pixel, a weight for the reference pixel is always 1 according to Equation (2). Meanwhile, in a case where anything other than the target pixel is set as the reference pixel, even if the signal components of the reference pixel and the target pixel are the same, an event in which the weight is 1 is very rare, and an expected value of the weight, which is a typical value, is considerably smaller than 1. An expected value W of the weight is calculated as given below. $P(x|N_b)$ is a probability distribution function of the sum of the squares of the difference x in a case where the target region has $N_b$ pixels and in a case where the signal components are the same.

$$W = \int_0^\infty \exp\left(-\frac{x}{h^2/[2\sigma^2]}\right) P(x \mid N_b) dx \quad (5)$$

For example, in a case where the number $N_b$ of target region pixels is 9, the expected value of the weight is about 0.16 in a case where the parameter h is double the standard deviation σ. Likewise, in a case where the number $N_b$ of target region pixels is 25 and the parameter h is 2σ, the expected value of the weight is about 0.0063. As described above, if the weight is derived based on Equation (2), the weight for the pixel value of the target pixel itself has an overwhelmingly larger value than the weights for the pixel values of other reference pixels. Thus, even if a weighted mean is calculated for a smooth image formed of a uniform signal component and noise component, the weight for the pixel value of the target pixel itself is overwhelmingly large, and thus, substantially the same value as the value of the target pixel itself is obtained. As a result, sufficient noise reduction is not performed on the target pixel. This effect becomes more remarkable as the number $N_b$ of pixels of the target region becomes larger, and the effect becomes serious if the target region is larger than 4×4 blocks ($N_b$=16).

Meanwhile, in a case where the parameter h is considerably larger than the standard deviation σ of noise, the weight calculated based on Equation (2) is slightly smaller than 1. For example in a case where h=5σ, the expected values of the weights are about 0.71 and about 0.38 in a case where $N_b$=9 and in a case where $N_b$=25, respectively. Thus, if the parameter h is large, a weighted mean is calculated by using a weight such that the pixel value of the reference pixel is smaller than 3 times the pixel value of the target pixel, specifically such that, in a case where $N_b$=9, the pixel value of the reference pixel is about 1.4 times the pixel value of the target pixel, or such that, in a case where $N_b$=25, the pixel value of the reference pixel is about 2.6 times the pixel value of the target pixel. If a ratio between the weight for the target pixel and the weight for the reference pixel is set to this extent, noise of the target pixel is reduced by the weighted mean. However, the setting of the parameter h to a large value means that the sum of the squares of the difference, even if having a large value, is used to calculate a mean value. In other words, this means that the sum of the squares of the difference is used to calculate the mean even in a case where the signal components of the target pixel and the reference pixel do not statistically significantly match each other, and as a result, a blurred image appears. In order to obtain a noise-reduced image with little blur, the weight for the reference pixel whose signal component does not statistically significantly match the signal component of the target pixel is required to have a sufficiently smaller value than the weight for the reference pixel whose signal component statistically significantly matches the signal component of the target pixel.

Whether or not the signal components statistically significantly match each other can be determined by the value of $\chi_{ij}$. Specifically, a value $\chi_{th}$ which satisfies Equation (6) is determined, and, in a case where $\chi_{ij}$ is larger than the value $\chi_{th}$, a determination is made that the signal component of each of pixels in the reference region does not match the signal component of each of pixels in the target region.

$$1 - \int_0^{\chi_{th}} dx P(x \mid N_b) = \varepsilon \quad (6)$$

Here, ε denotes a significance level in a case where a null hypothesis that the signal component of each of the pixels in the reference region matches the signal component of each of the pixels in the target region is rejected. For example, ε is set equal to 0.001 (ε=0.001). The left side of Equation (6) represents a probability that $\chi_{ij}$ exceeds $\chi_{th}$ in a case where the signal component of each of the pixels in the reference region matches the signal component of each of the pixels in the target region. In other words, a determination is made that the signal components do not match each other, in a case where the probability that $\chi_{ij}$ exceeds $\chi_{th}$ in a case where the signal component of each of the pixels in the reference region matches the signal component of each of the pixels in the target region is equal to or less than 1/1000. Then, in order to prevent an image after noise reduction from becoming blurred, the weight for $\chi_{ij}$ for which a determination is made that the signal components do not match each other, or the sum of the squares of the difference $D_{ij}$ corresponding to $\chi_{ij}$ should be equal to or less than at least 1/25 of the expected value W of the weight in a case where the signal components match each other. More preferably, the weight is equal to or less than about 1/100 of the expected value W. An investigation as to the value of the weight for $\chi_{ij}$ for which a determination is made that the signal components do not match each other shows that, in a case where h=5σ, the weights are about 0.11 and about 0.015 in a case where $N_b$=9 and in a case where $N_b$=25, respectively. These values are not so small as compared to the expected values, 0.71 and 0.38, of the weight, and thus, a somewhat blurred image appears.

Incidentally, a detailed investigation shows that, only in a case where $N_b$ is equal to or less than 16, even with the conventional non-local means method, the parameter h which satisfies a condition as given below is present; specifically, the weight for the target pixel is 3 or less times the expected value of the weight, and the weight for the pixel whose signal component does not match is equal to or less than 1/100 of the expected value. However, the range of the parameter h which satisfies the condition is narrow, and the degree of freedom of image quality adjustment is low. Also, if the value of $N_b$ is set small, a problem arises as given below; specifically, a degradation in image quality occurs due to another cause such as the fact that a low-frequency component of noise is difficult to fall, and it is not necessarily possible to freely set $N_b$ to a small value. After all, the conventional non-local means method has the problem of having difficulty in obtaining an image which achieves both noise reduction and retention of an edge or a texture.

Details of First Embodiment

As mentioned above, in the conventional non-local means method, the weight for the reference pixel derived in a case where the same region as the target region is set as the reference region (in this case, the target pixel is the reference pixel) is not statistically likely. Therefore, it is difficult to obtain an image which achieves both noise reduction and edge retention. In the first embodiment, the weight in a case where the same region as the target region is set as the reference region, or equivalently, in a case where the reference pixel is the target pixel itself, is set relatively smaller than hitherto thereby to solve this problem. Here, use of the term "relatively" is for the purpose of providing a weighted mean having a degree of freedom such that results remain unchanged even if all weights are multiplied by a constant factor. The essence of the first embodiment is that a relative difference between a weight for a reference pixel other than the target pixel and a weight for a reference pixel derived in a case where the same region as the target region is set as the reference region is set small, not that the weight for the reference pixel derived in a case where the same region as the target region is set as the reference region is simply set smaller than a predetermined value. Therefore, for example, a weight derived in a case where a pixel other than the target pixel is set as the reference pixel may be set to a value close to 1 so as to become relatively high. By setting such a relative difference small, the weight derived in a case where the same region as the target region is set as the reference region is statistically likely. Therefore, it is possible to obtain an image which achieves both noise reduction and edge retention.

Details of the first embodiment will be described below. In the first embodiment, in order to solve the problem, a determination is made as to whether a reference region to be processed is the same as a target region, and processing performed in a case where the reference region is the same as the target region is different from processing performed in a case where the reference region is not the same as the target region. In other words, description will be given with regard to an example in which different types of processing are performed according to a result of a determination as to whether or not a reference pixel which forms the reference region is a target pixel itself.

Figure 4:
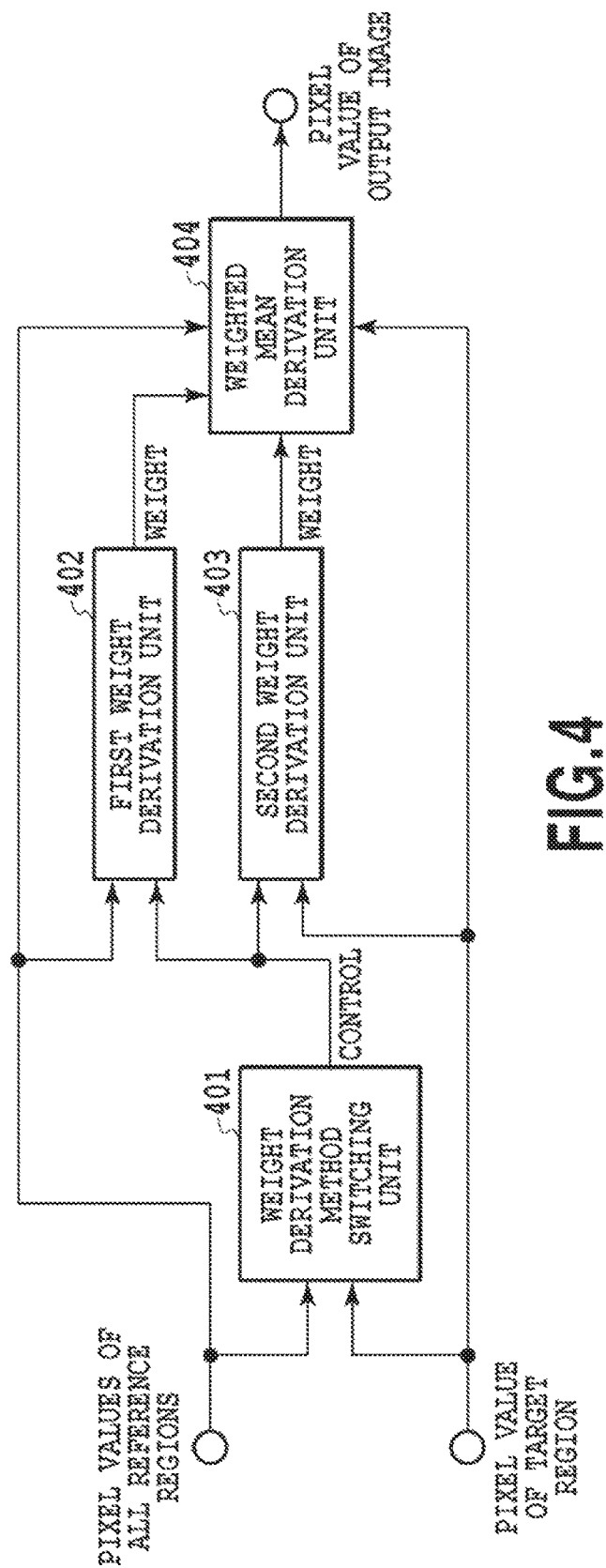
FIG. 4 is a block diagram of an image processing apparatus according to a first embodiment.

A specific noise reduction processing method will be described with reference to a block diagram of FIG. 4 and a flowchart of FIG. 5. FIG. 4 is a diagram illustrating an example of processing blocks of the image processing apparatus. The image processing apparatus illustrated in FIG. 4 includes a weight derivation method switching unit 401, a first weight derivation unit 402, a second weight derivation unit 403, and a weighted mean derivation unit 404.

The weight derivation method switching unit 401 receives inputs of pixel values of all reference regions and a pixel value of a target region, and performs processing for switching between weight derivation methods.

The first weight derivation unit 402 derives similarity of a reference pixel except a target pixel, and derives a weight for the reference pixel from the similarity. The first weight derivation unit 402 may be configured as a processing unit based on the non-local means method which is generally performed. Incidentally, the first weight derivation unit 402 may have any configuration, provided that it has the function of deriving a different weight from that derived by the second weight derivation unit 403 to be described later.

The second weight derivation unit 403 derives a weight for the target pixel. In other words, the second weight derivation unit 403 derives a weight for the reference pixel (or the target pixel) in a case where the target pixel is processed as the reference pixel. Although any method may be used as the weight derivation method, it is necessary that a different derivation method from that used by the first weight derivation unit 402 be used to derive the weight. For example, in a case where the target pixel is set as the reference pixel and the pixel values are inputted to the first weight derivation unit 402 and the second weight derivation unit 403, the weight derivation units derive different weights. In short, the first embodiment is characterized in that, in a case where the target pixel is set as the reference pixel, weight derivation processing is different from that for other reference pixels.

The weighted mean derivation unit 404 derives a weighted mean as the pixel value of the target pixel in accordance with Equation (1) by using the weights derived by the first weight derivation unit and the second weight derivation unit.

The blocks illustrated in FIG. 4 perform processing on an input image for each pixel. Image data after noise reduction is obtained by performing the processing on all pixels.

Figure 5:
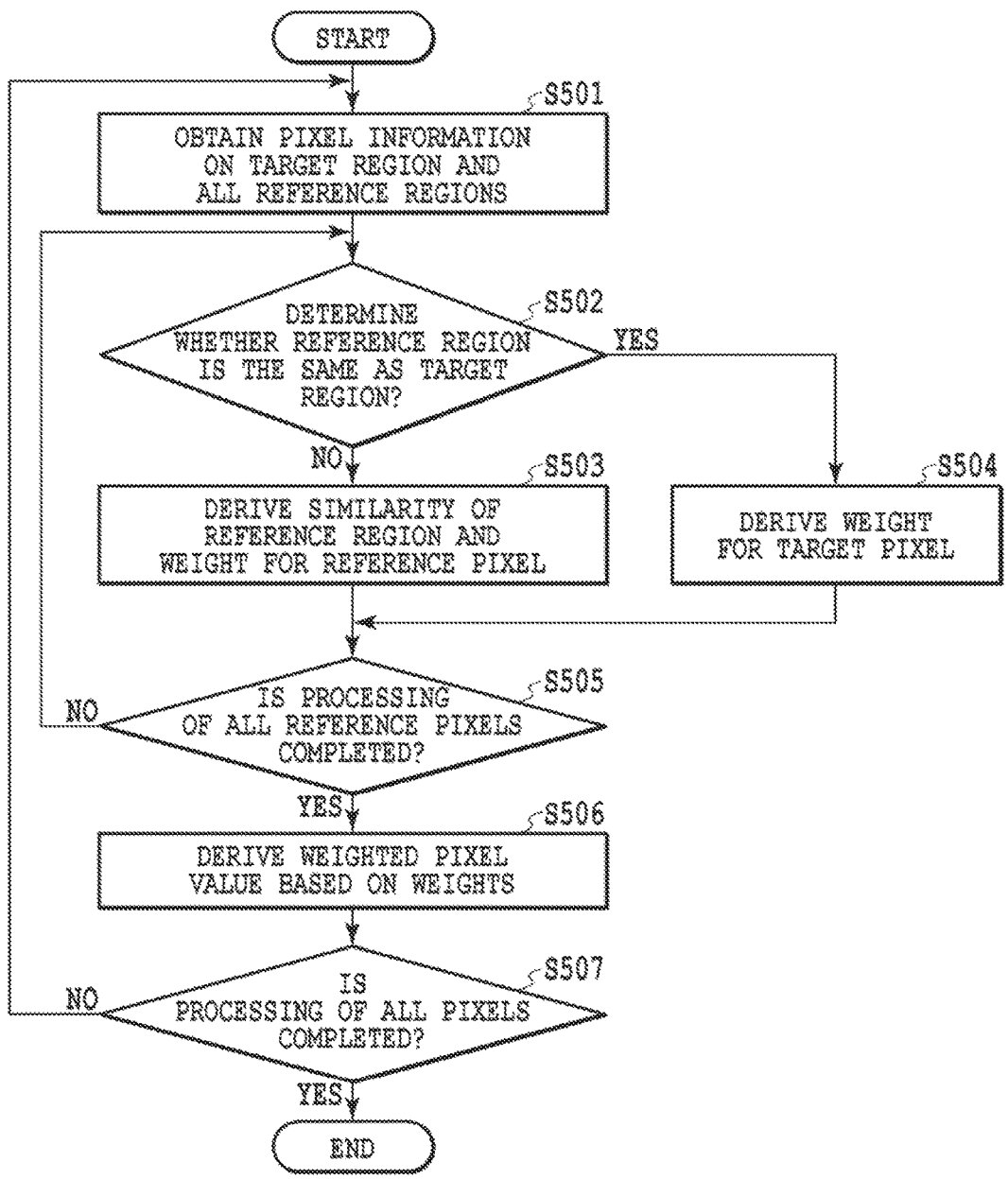
FIG. 5 is a flowchart illustrating a flow of processing of the first embodiment.

FIG. 5 is the flowchart illustrating a flow of processing by the image processing apparatus illustrated in FIG. 4. The processing illustrated in FIG. 5 is implemented by the CPU 101 executing the programs stored in the RAM 102 and thereby causing the programs to function as the processing units illustrated in FIG. 4.

First, at step S501, the weight derivation method switching unit 401 obtains pixel information such as a pixel value of a target region, pixel values of all reference regions, and pixel positions. At step S502, the weight derivation method switching unit 401 determines whether a region set as the reference region is the same as the target region. Here, a determination is made by determining whether the position of a reference pixel which forms the reference region is the same as the position of a target pixel. In a case where the target region and the reference region are different regions, the processing moves to step S503. Incidentally, the determining in step S502 is not limited to this method. In a case where the order in which pixels are set as the reference pixel is determined, whether the target pixel is set as the reference pixel may also be determined by the order in which the pixels are inputted as the reference pixel.

At step S503, the first weight derivation unit 402 derives similarity between the target region and the reference region and a weight for the reference pixel.

Meanwhile, in a case where the target region and the reference region are the same, or equivalently, in a case where the reference pixel which forms the reference region is the same as the target pixel, the processing moves to step S504. At step S504, the second weight derivation unit 403 derives a weight for the reference pixel (or the target pixel). Preferably, a weight in a case where the same region as the target region is set as the reference region, or equivalently, the weight which the second weight derivation unit 403 derives at step S504, is determined in the following manner. Specifically, it is preferable to set the expected value of the weight previously mentioned, or the value of a weight corresponding to the most frequent value ($N_b-2$) or the expected value ($N_b$) of the $\chi_{ij}$ distribution represented by Equation (4). In other words, in a case where the same region as the target region is set as the reference region, the weight for the reference pixel (or the target pixel itself) is too high. In a case where the same region as the target region is set as the reference region, it is therefore preferable to set the value of the weight corresponding to the likely value of the similarity. Also, at step S504, the second weight derivation unit 403 may derive 0 as the weight for the target pixel. In a case where 0 is derived, the secondary effect of eliminating noise in a case where the reference pixel bears the noise in spike form is obtained.

Incidentally, in a case where the target region and the reference region are the same, step S504 does not set a predetermined value as the weight but may use a derivation method such that the weight for the target pixel has some range. However, the above-mentioned problem is not solved in a case where the weight for the target pixel derived at step S504 is excessively larger than the weight for the reference pixel in a case where a pixel other than the target pixel derived at step S503 is set as the reference pixel. Desirably, the weight for the reference pixel (or, in this case, the target pixel) in a case where the target region and the reference region are the same is 10 or less times an expected value of a weight in a case where a pixel having at least the same signal component is set as the reference pixel, or preferably, a value about 5 times the expected value is set as an upper limit. The reason is that, even in the case of the same signal component, the pixel value of the target region and the pixel value of the reference region rarely match each other due to a noise component. In short, desirably, a weight which occurs although it is an inherently rare phenomenon is set as a weight which can be statistically likely, thereby to set such a value as to reduce a difference between the weights derived by the first weight derivation unit 402 and the second weight derivation unit 403. In other words, at step S504, the second weight derivation unit 403 may derive the weight so that the weight is equal to or more than 0 and is 5 or less times the value of the weight expected in a case where the pixel value of the target region and the pixel value of the reference region match each other except for noise.

The derivation of the weight for the reference pixel as described above is performed on all reference pixels. At step S505, the weight derivation method switching unit 401 determines whether the processing of all reference pixels is completed. In a case where the weight derivation method switching unit 401 determines that the processing of all reference pixels is completed, the processing moves to step S506. In a case where the weight derivation method switching unit 401 determines that the processing of all reference pixels is not completed, the weight derivation method switching unit 401 returns to step S502.

Then, at step S506, the weighted mean derivation unit 404 derives a weighted mean based on the weights derived at step S503 and step S504, and outputs a pixel value of an output image. Incidentally, the weighted mean cannot be defined in a case where all weights are 0. In a case where the weight for the target pixel is set to 0, this phenomenon may occur; however, in this case, the weighted mean derivation unit 404 outputs the pixel value of the target pixel as it is.

Finally, at step S507, the weight derivation method switching unit 401 determines whether the processing of all pixels is completed. In a case where the weight derivation method switching unit 401 determines that the processing is not completed, the processing returns to step S501, while on the other hand, in a case where the weight derivation method switching unit 401 determines that the processing is completed, the processing comes to an end. An output image subjected to the noise reduction processing is obtained by a series of processing operations described above.

In the first embodiment, as described above, whether the reference region is the same region as the target region is determined to switch between processing modes, and thereby, the pixel value can be derived without the value of the target pixel itself being excessively affected. As a result, a good image subjected to proper noise reduction processing can be obtained.

Second Embodiment

Since the overall configuration of an image processing apparatus according to a second embodiment is the same as that of the first embodiment illustrated in FIG. 1, description of the same configuration will be omitted, and description will be given below with regard to different portions from the first embodiment.

The first embodiment provides the approach of obtaining a good image by switching between weight derivation processing modes, in a case where the same region as a target region is set as a reference region. The second embodiment provides an approach for overcoming the problem by changing the form of a function for deriving a weight from similarity.

The problem inherent in the conventional non-local means method is caused by the fact that, in a case where a target pixel is set as a reference pixel, a statistically extremely rare and unlikely event in which similarity is strictly 0 always occurs by this definition. Therefore, the form of a function for transforming similarity into a weight as represented by Equation (2) of the first embodiment is changed to set a weight relatively smaller than that obtained by the conventional approach, in a case where the value of statistically unlikely similarity is obtained, and thereby, the problem can be avoided. The meaning of the term "relatively" is as already described in the first embodiment.

In order to solve the problem, in a case where, even if similarity is high (or the sum of the squares of the difference is small), the probability of actual observation of the similarity is statistically very rare, a weight function such that a weight becomes small can be used. A simple weight function having such characteristics can be considered to be the probability itself of observation of certain similarity, a weight function having monotonicity for the probability, or the like. It is to be noted that, even if the monotonicity between the probability of the observation of the similarity and the weight is broken and an inversion phenomenon occurs, the phenomenon does not become a large problem if its influence is slight. Therefore, the form of the function for determining the weight can be flexibly set to some extent. Also, in a case other than a case where the sum of the squares of the difference is 0, even if a weight for similarity having a sufficiently low probability of being observed is set to any value, a large problem does not arise because the similarity is not actually observed.

In the second embodiment, a minimum important property to be possessed by the weight function is that the weight in a case where the same region as the target region is set as the reference region is less than 10 times the expected value of the weight in the case of the same signal component. More preferably, the weight for the target pixel derived in a case where the same region as the target region is set as the reference region is about 1 to 5 times the expected value of the weight in the case of the same signal component. Alternatively, it is also preferable that the weight for the target pixel derived in a case where the same region as the target region is set as the reference region be not the sole maximum value of the weight function. If the weight in a case where the same region as the target region is used as the reference region is set to the above extent, the weight in a case where the value of statistically unlikely similarity is obtained becomes relatively smaller than that obtained by the conventional approach, and thus, a large problem does not arise.

FIGS. 6A to 6C illustrate, by solid lines, examples of functions for transforming $\chi_{ij}$ into a weight, used in the second embodiment. Also, the weight functions represented by Equation (2) in a case where h=2.5σ and in a case where h=5σ are illustrated by dash-double dot lines and dash-dot lines, respectively, for comparison with the conventional non-local means method. Further, a probability distribution of a value obtained by dividing $\chi_{ij}$ in a case where the signal components match each other by the number $N_b$ of target region pixels is illustrated by dotted lines. Here, $N_b$ is set equal to 25 ($N_b$=25). The horizontal axis indicates the value obtained by dividing $\chi_{ij}$ by the number $N_b$ of target region pixels, and the vertical axis indicates the weight (on the left scale) and the value of the probability distribution (on the right scale). Vertical broken lines are drawn at a location where the value of the horizontal axis is about 2.1, and the broken lines indicate the lines on which the left side of Equation (6) is 0.001. As described for the first embodiment, in a case where the value of the horizontal axis is larger than $\varepsilon=0.001$, this indicates that the pixel value of the target region and the pixel value of the reference region cannot be considered to match each other except for noise. Therefore, for a value larger than $\varepsilon=0.001$, a function is set so that the weight has an extremely low value.

The form of the weight function of FIG. 6A is a constant which is not 0 for the time being even if $\chi_{ij}$ increases from 0, and the form continues until immediately before a determination is not made that the pixel value of the target region and the pixel value of the reference region match each other except for noise. Then, a further increase in $\chi_{ij}$ leads to the weight becoming 0 or a sufficiently smaller value than a value before that. In the weight functions represented by Equation (2) (in a case where $h=2.5\sigma$ and in a case where $h=5\sigma$) illustrated for comparison with the conventional non-local means method, the weight is 1 in a case where the target region matches the reference region (or in a case where $\chi_{ij}$ is 0 in FIG. 6A). Meanwhile, in the function of FIG. 6A, the weight is a constant, including a case where the target region matches the reference region, until a value at which the pixel value of the target region and the pixel value of the reference region cannot be considered to match each other except for noise. Therefore, the weight does not become extremely high in a case where the target region matches the reference region.

The form of the weight function of FIG. 6B is such that a ratio between the weight in a case where $\chi_{ij}$ is 0 and the weight in a case where the value of the probability distribution of $\chi_{ij}/N_b$ is high is not so high as compared to hitherto. For example, looking at the weight in a case where the value of the probability distribution of $\chi_{ij}/N_b$ is high, 1.0, the weight is substantially 0 in the conventional case where $h=2.5\sigma$, and the weight is about 0.2 in the conventional case where $h=5\sigma$, whereas, in the weight function of FIG. 6B, the weight is about 0.6. Then, the weight has a sufficiently small value in a region where the pixel value of the target region and the pixel value of the reference region cannot be considered to match each other except for noise.

The form of the weight function of FIG. 6C is such that the weight in a case where $\chi_{ij}$ is 0 is further reduced so that the weight in a case where $\chi_{ij}$ is 0 is equal to or less than the weight in a case where the value of the probability distribution of $\chi_{ij}/N_b$ is high (or at a location where the value of the horizontal axis is 1.0). This form of the function further reduces the weight for the target pixel itself and thus can easily achieve a high degree of noise reduction.

Figure 7:
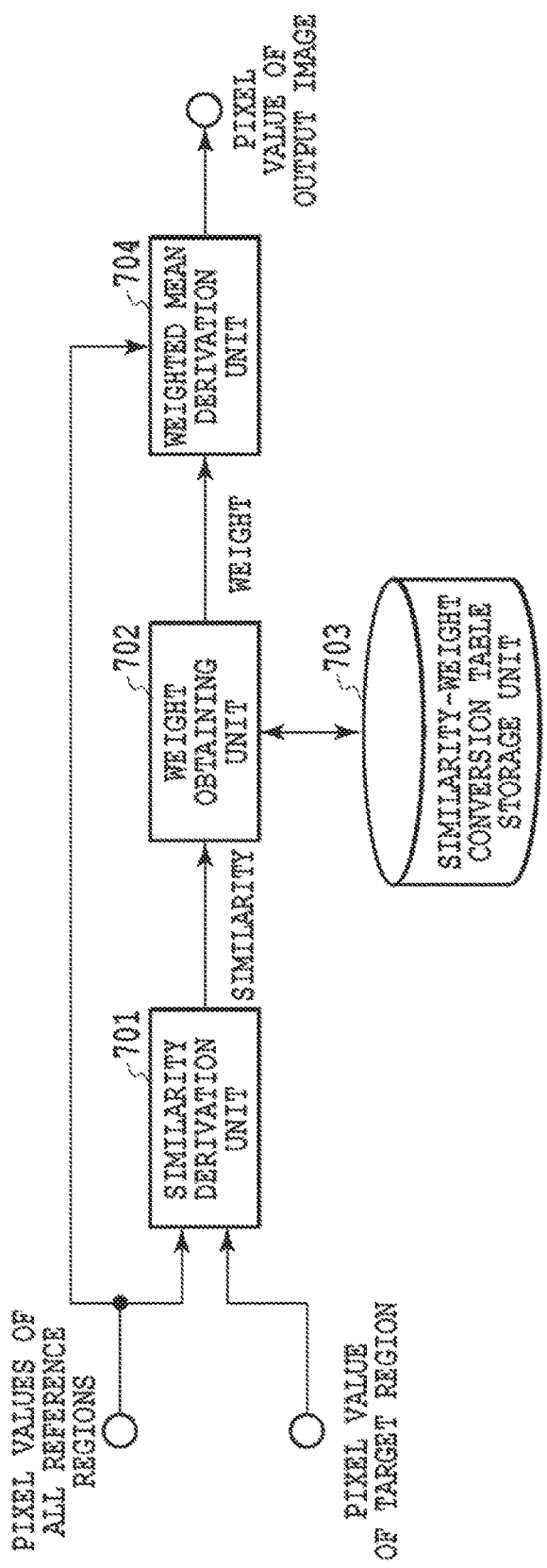
FIG. 7 is a block diagram of an image processing apparatus according to the second embodiment.

Description will be given below with regard to processing of the second embodiment with reference to a block diagram of FIG. 7 and a flowchart of FIG. 8. FIG. 7 is a diagram illustrating an example of processing blocks of the image processing apparatus according to the second embodiment. The image processing apparatus of FIG. 7 includes a similarity derivation unit 701, a weight obtaining unit 702, a similarity-weight conversion table storage unit 703, and a weighted mean derivation unit 704.

The similarity derivation unit 701 receives inputs of pixel values contained in all reference regions and a pixel value contained in a target region, and outputs similarity.

The weight obtaining unit 702 derives a weight from a similarity-weight conversion table stored in the similarity-weight conversion table storage unit 703, by using the similarity derived by the similarity derivation unit 701.

The similarity-weight conversion table storage unit 703 stores a conversion table which follows a function system in which a weight in a case where the reference region is the same region as the target region is less than 10 times an expected value of a weight in a case where a signal component of a reference pixel is the same as a signal component of a target pixel. Also, more preferably, the conversion table is such that the weight in a case where the reference region is the same region as the target region is about 1 to 5 times the expected value of the weight in a case where the signal component of the reference pixel is the same as the signal component of the target pixel. Alternatively, preferably, the conversion table is also such that the weight for a case where the reference region is the same region as the target region is not the sole maximum value of the weight function. Specifically, the similarity-weight conversion table storage unit 703 stores a conversion table corresponding to any one of the functions illustrated in FIGS. 6A to 6C.

The weighted mean derivation unit 704 derives a weighted mean by using the weight outputted by the weight obtaining unit 702, and outputs a pixel value of an output image.

The blocks illustrated in FIG. 7 perform processing on an input image for each pixel. An image after noise reduction is obtained by performing the processing on all pixels.

Figure 8:
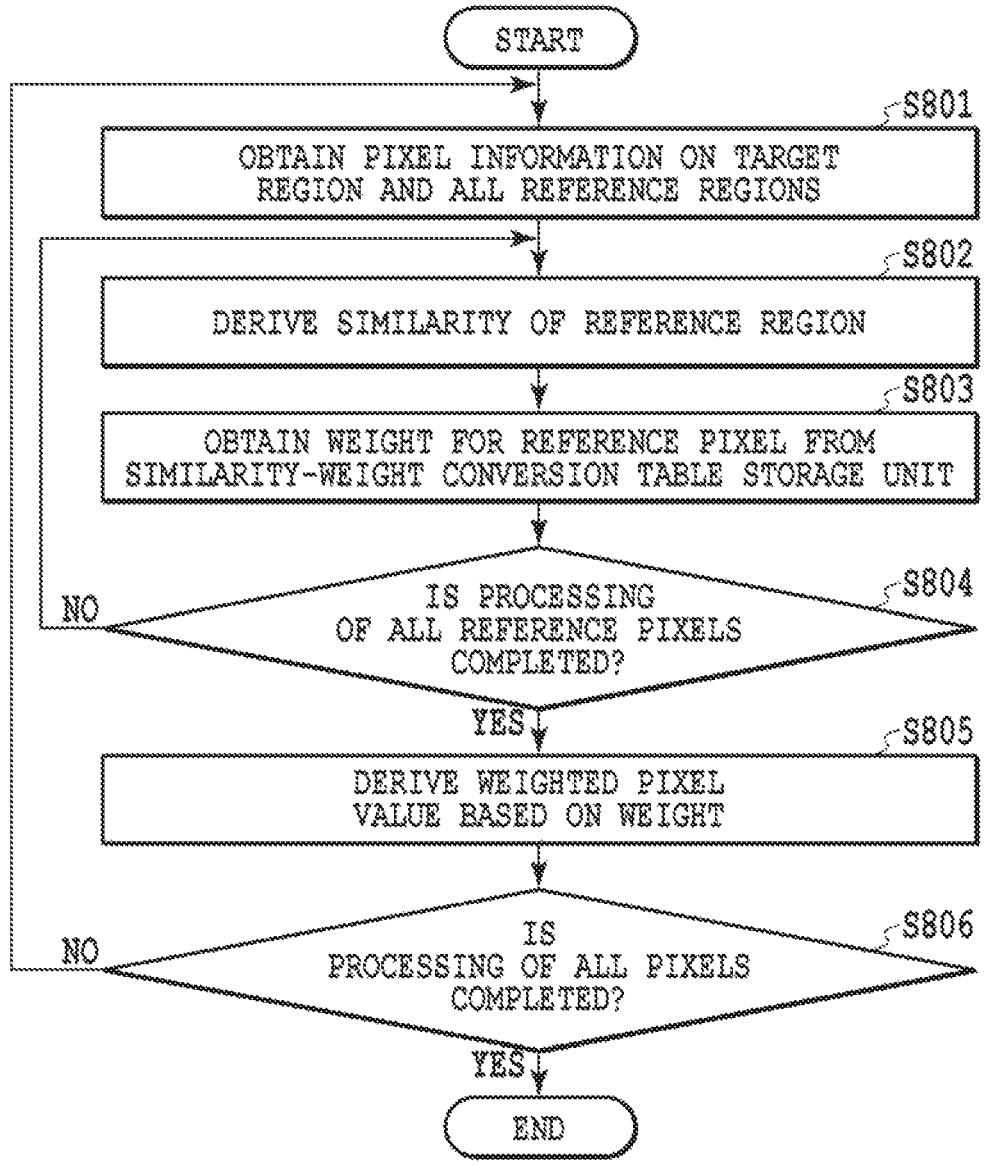
FIG. 8 is a flowchart illustrating a flow of processing of the second embodiment.

FIG. 8 is the flowchart illustrating a flow of processing by the image processing apparatus illustrated in FIG. 7. The processing illustrated in FIG. 8 is implemented by the CPU 101 executing the programs stored in the RAM 102 and thereby causing the programs to function as the processing units illustrated in FIG. 7.

At step S801, the similarity derivation unit 701 obtains pixel information such as a pixel value of a pixel in a target region, pixel values of pixels in all reference regions, and pixel positions. At step S802, the similarity derivation unit 701 derives similarity between the target region and the reference region by using the sum of the squares of the difference as represented by Equation (3), for example.

Then, at step S803, the weight obtaining unit 702 obtains the similarity derived by the similarity derivation unit 701. Then, the weight obtaining unit 702 obtains a weight corresponding to the obtained similarity from the similarity-weight conversion table storage unit 703. A similarity-weight conversion table stored in the similarity-weight conversion table storage unit 703 is a conversion table specified by each of the functions illustrated in FIGS. 6A to 6C, for example. The weight obtaining unit 702 obtains the weight corresponding to the similarity from the conversion table corresponding to any one of the functions illustrated in FIGS. 6A to 6C, for example. As mentioned above, the weight obtained in this manner is derived by using a weight function such that the weight becomes small, in a case where, even if the similarity is high (or the sum of the squares of the difference is small), the probability of actual observation of the similarity is statistically very rare.

At step S804, the similarity derivation unit 701 determines whether an unprocessed reference pixel is present. In a case where the similarity derivation unit 701 determines that the unprocessed reference pixel is present, the processing returns to step S802. In a case where the similarity derivation unit 701 determines that the unprocessed reference pixel is absent, the processing moves to step S805.

At step S805, the weighted mean derivation unit 704 derives a weighted mean in accordance with Equation (1), based on the weight obtained by the weight obtaining unit 702, and outputs the weighted mean as a pixel value of an output image.

Finally, the similarity derivation unit 701 determines whether the processing of all pixels is completed; in a case where the processing is not completed, the processing returns to step S801, while on the other hand, in a case where the processing is completed, the processing comes to an end. An output image subjected to the noise reduction processing is obtained by a series of processing operations described above.

In the second embodiment, as described above, a good image can be obtained by using a similarity-weight conversion function such that the weight for a case where the reference region is the same region as the target region becomes relatively smaller than hitherto.

Third Embodiment

Since the overall configuration of an image processing apparatus according to a third embodiment is the same as that of the first embodiment illustrated in FIG. 1, description of the same configuration will be omitted, and description will be given below with regard to different portions from the first embodiment.

The first and second embodiments provide an example of a case where the same region as a target region is set as one reference region. In the third embodiment, firstly, description will be given with regard to a method in which a reference region is set so as not to contain a target region. This is mathematically equivalent to a case where a weight is set to 0 in a case where the reference region is equal to the target region, as mentioned for the first embodiment. Therefore, if the setting of the reference region is made merely so as not to set the same region as the target region, in a case where only a reference pixel having quite a different signal component is present around a target pixel, a weight for all reference pixels is set to 0, and thus, calculation of a weighted mean becomes impossible. Also, in a case where all reference pixels around the target pixel have low similarity to the target pixel to the same extent, the weights for the reference pixels may be small and about the same. In this case, even though the reference region is not similar to the target pixel, all reference pixels are added together in the same manner to derive the weighted mean, which in turn causes the problem of outputting quite a different value from a signal component of the target pixel (or the problem of an image becoming blurred).

In the third embodiment, a portion for determining whether the target pixel is used as the reference pixel is provided in order to address the problem. This determining is accomplished by determining whether a reference pixel having high similarity is present. It is particularly desirable to make a determination from the viewpoint of whether a reference region judged as having statistically substantially the same signal component as the signal component of each pixel in the target region is present. Specifically, an examination is made as to whether a reference region where the sum of the squares of the difference is smaller than a certain value is present, or whether a reference pixel in which a weight is larger than a certain value is present. Then, in a case where a reference region which is likely to have statistically substantially the same signal component as that of the target region is present, the use of the reference region enables deriving a proper weighted mean and thus enables determining that the target pixel is not used as the reference pixel. More detailed mention will be made of a case where the sum of the squares of the difference is used to make a determination; in the case of the same signal component, the amount obtained by dividing the sum of the squares of the difference by double the noise variance follows the chi square distribution. Therefore, a reject probability is set, and a threshold value at which the probability of the same signal component is equal to or lower than the reject probability is calculated, and, in a case where the sum of the squares of the difference is smaller than the threshold value, a determination can be made that the signal components are the same. Even in a case where noise does not have a Gaussian distribution or in a case where a coefficient $\alpha_k$ of a window function depends on k, the threshold value can be set by examining in advance a range of likely values in the case of the same signal component according to the circumstances.

Figure 9:
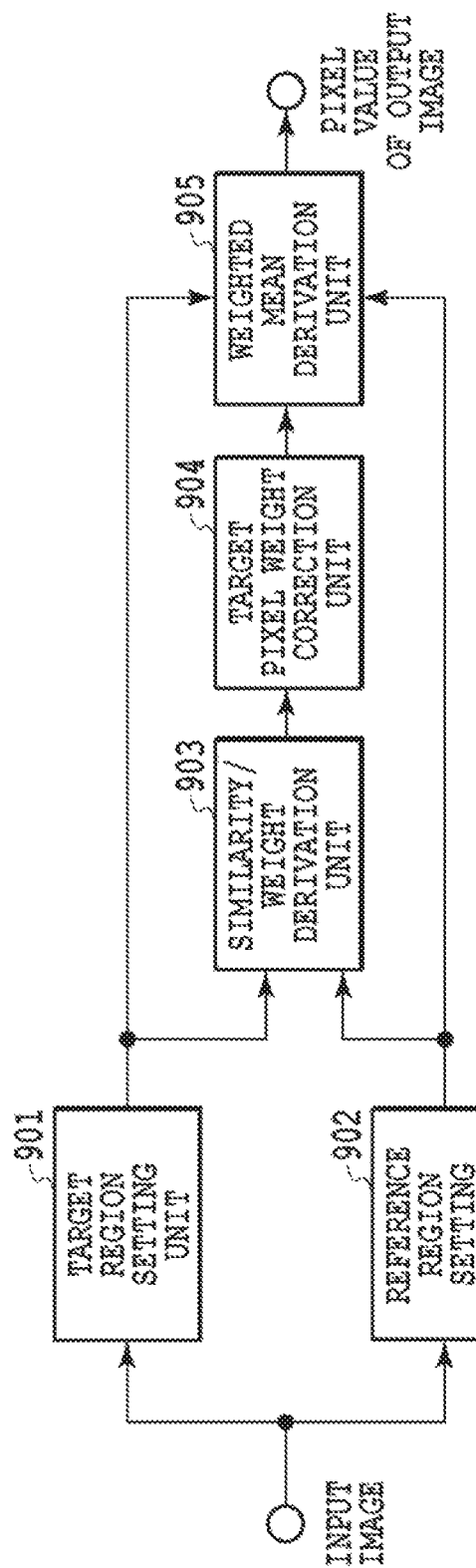
FIG. 9 is a block diagram of an image processing apparatus according to a third embodiment.

Description will be given below with regard to processing of the third embodiment with reference to a block diagram of FIG. 9 and a flowchart of FIG. 10. FIG. 9 is a diagram illustrating an example of processing blocks of the image processing apparatus according to the third embodiment. The image processing apparatus illustrated in FIG. 9 includes a target region setting unit 901, a reference region setting unit 902, a similarity/weight derivation unit 903, a target pixel weight correction unit 904, and a weighted mean derivation unit 905.

The processing units illustrated in FIG. 9 perform processing on an input image for each pixel. An image after noise reduction is obtained by performing the processing on all pixels.

Figure 10:
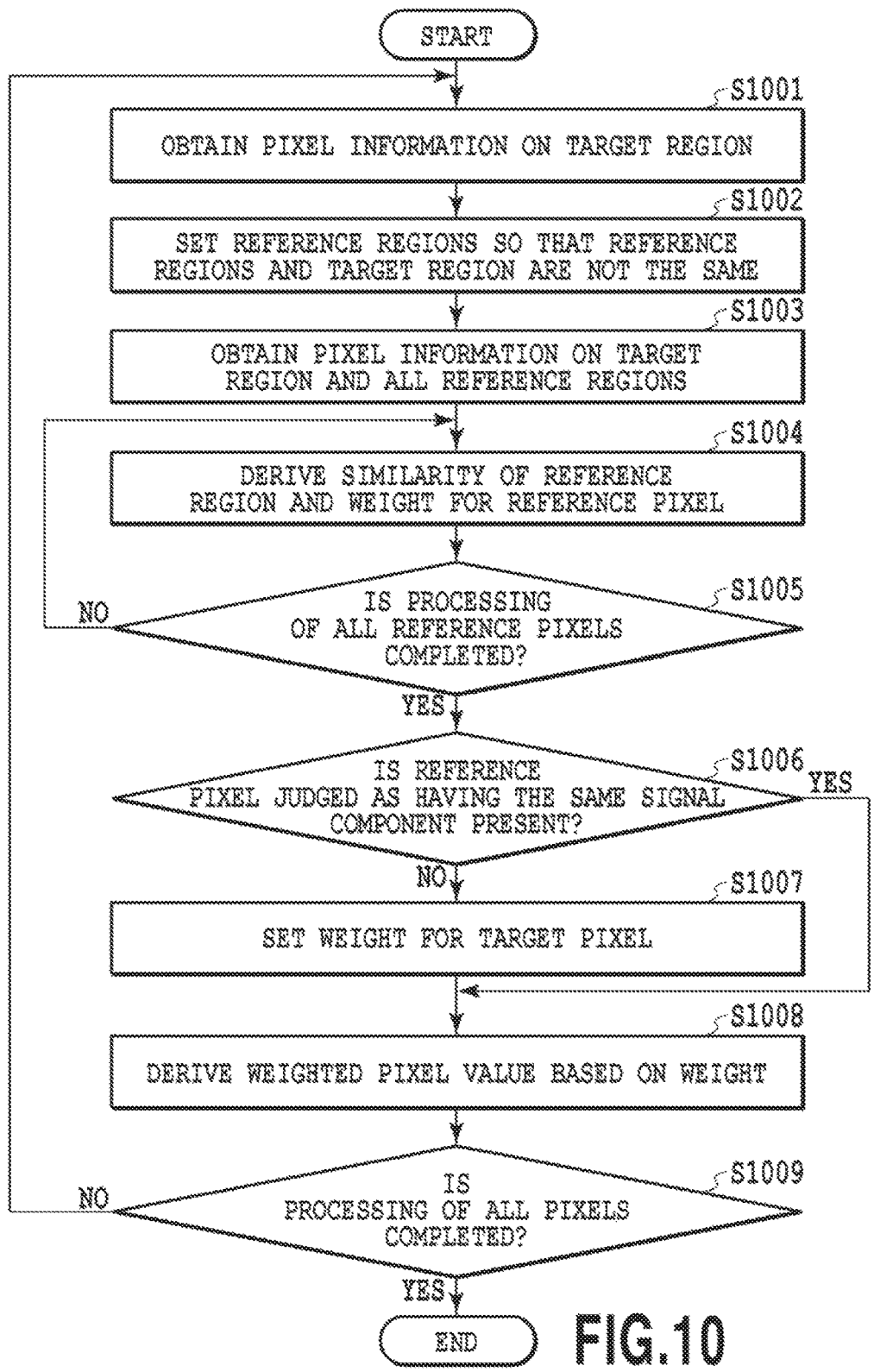
FIG. 10 is a flowchart illustrating a flow of processing of the third embodiment.

FIG. 10 is the flowchart illustrating a flow of processing by the image processing apparatus illustrated in FIG. 9. The processing illustrated in FIG. 10 is implemented by the CPU 101 executing the programs stored in the RAM 102 and thereby causing the programs to function as the processing units illustrated in FIG. 9.

At step S1001, first, the target region setting unit 901 sets a target pixel and a region around the target pixel as a target region. Then, at step S1002, the reference region setting unit 902 sets plural reference pixels to be referred to, and regions around the reference pixels, as plural reference regions. At this time, the reference region setting unit 902 sets the reference regions in such a manner that the reference regions and the target region are not the same.

At step S1003, the similarity/weight derivation unit 903 obtains pixel information containing pixel values and pixel positions of the target region and all reference regions. Then, at step S1004, the similarity/weight derivation unit 903 derives similarity between the target region and the reference region and a weight for a reference pixel. At step S1005, the similarity/weight derivation unit 903 determines whether an unprocessed reference pixel is present, and the similarity/weight derivation unit 903 repeats the processing of step S1004 until the processing is finished for all reference pixels.

Then, at step S1006, the target pixel weight correction unit 904 examines the weight for the reference pixel thereby to determine whether a reference region judged as having substantially the same signal component as that of the target pixel is present. As mentioned above, the determination of step S1006 can be made based on whether a reference region where the sum of the squares of the difference is smaller than a certain value is present, or whether a reference pixel in which a weight is larger than a certain value is present. The determination of step S1006 enables deriving a weighted mean even without the use of the target region as the reference region, or enables preventing the outputting of quite a different value from the signal component of the target pixel. In a case where at step S1006 the target pixel weight correction unit 904 determines that the reference region judged as having substantially the same signal component as that of the target pixel is absent, at step S1007 the target pixel weight correction unit 904 sets a weight for the target pixel. In other words, although at step S1002 the reference region is set in such a manner that the target region and the reference region are not the same, it is necessary to use the target pixel as the reference pixel because the reference region judged as having substantially the same signal component as that of the target pixel is absent. Therefore, although the target pixel is used as the reference pixel, the weight for the target pixel is set as described for the first embodiment. For example, at step S1007, the target pixel weight correction unit 904 can use a value corresponding to a statistically likely similarity in the case of the same signal component, as the weight for the target pixel.

Meanwhile, in a case where at step S1006 the weight for the reference pixel is examined and the reference region judged as having substantially the same signal component as that of the target pixel is present, a weighted mean can be derived by using such a reference region, even without using the target pixel as the reference pixel. Therefore, the processing moves to step S1008 without performing step S1007.

At step S1008, the weighted mean derivation unit 905 derives a weighted mean based on the weight obtained at step S1004, and derives the weighted mean as a pixel value of an output image. At step S1008, the weighted mean derivation unit 905 incorporates the target pixel in the weighted mean, if at step S1007 the weight is set for the target pixel.

Finally, at step S1009, the image processing apparatus determines whether the processing of all pixels is completed; in a case where the processing is not completed, the processing returns to step S1001, while on the other hand, in a case where the processing is completed, the processing comes to an end. An output image subjected to the noise reduction processing is obtained by a series of processing operations described above.

In the third embodiment, as described above, the reference region is set in such a manner that the reference region is not the same region as the target region, and thereafter, a determination is made as to whether the same region as the target region is used as the reference region according to the similarity of the reference pixel, and thereby, a better image can be obtained than hitherto.

Fourth Embodiment

Since the overall configuration of an image processing apparatus according to a fourth embodiment is the same as that of the first embodiment illustrated in FIG. 1, description of the same configuration will be omitted, and description will be given below with regard to different portions from the first embodiment.

The first embodiment provides an example in which whether a reference region is the same as a target region is determined to switch between weight derivation methods. In the fourth embodiment, description will be given with regard to a method which involves using the same weight derivation method regardless of whether the reference region and the target region are the same, and thereafter recalculating a weight for the reference region which is the same as the target region. Although the fourth embodiment can achieve the same effect as that of the first embodiment, the fourth embodiment is different from the first embodiment in the order in which processing is performed.

In the fourth embodiment, a target pixel weight re-derivation unit is provided in order to recalculate the weight for the reference region which is the same region as the target region.

Figure 11:
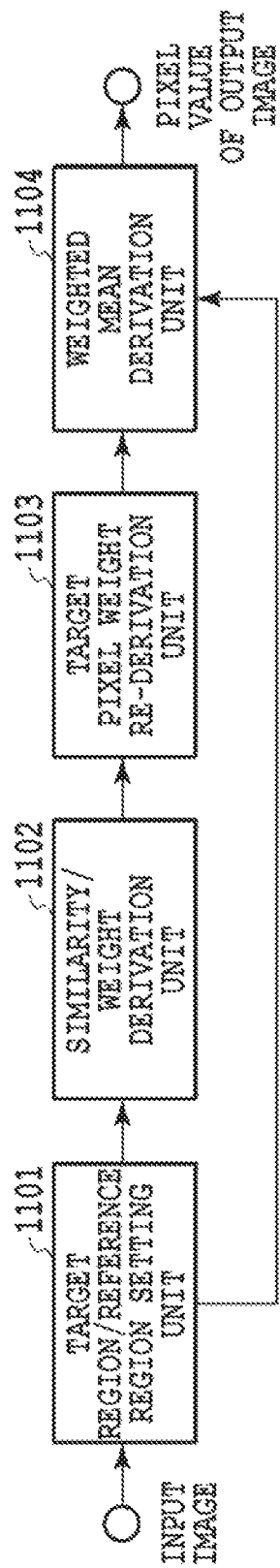
FIG. 11 is a block diagram of an image processing apparatus according to a fourth embodiment.

Description will be given below with regard to processing of the fourth embodiment with reference to a block diagram of FIG. 11 and a flowchart of FIG. 12. FIG. 11 is a diagram illustrating an example of processing blocks of the image processing apparatus according to the fourth embodiment. The image processing apparatus illustrated in FIG. 11 includes a target region/reference region setting unit 1101, a similarity/weight derivation unit 1102, a target pixel weight re-derivation unit 1103, and a weighted mean derivation unit 1104.

The processing units illustrated in FIG. 11 perform processing on an input image for each pixel. An image after noise reduction is obtained by performing the processing on all pixels.

Figure 12:
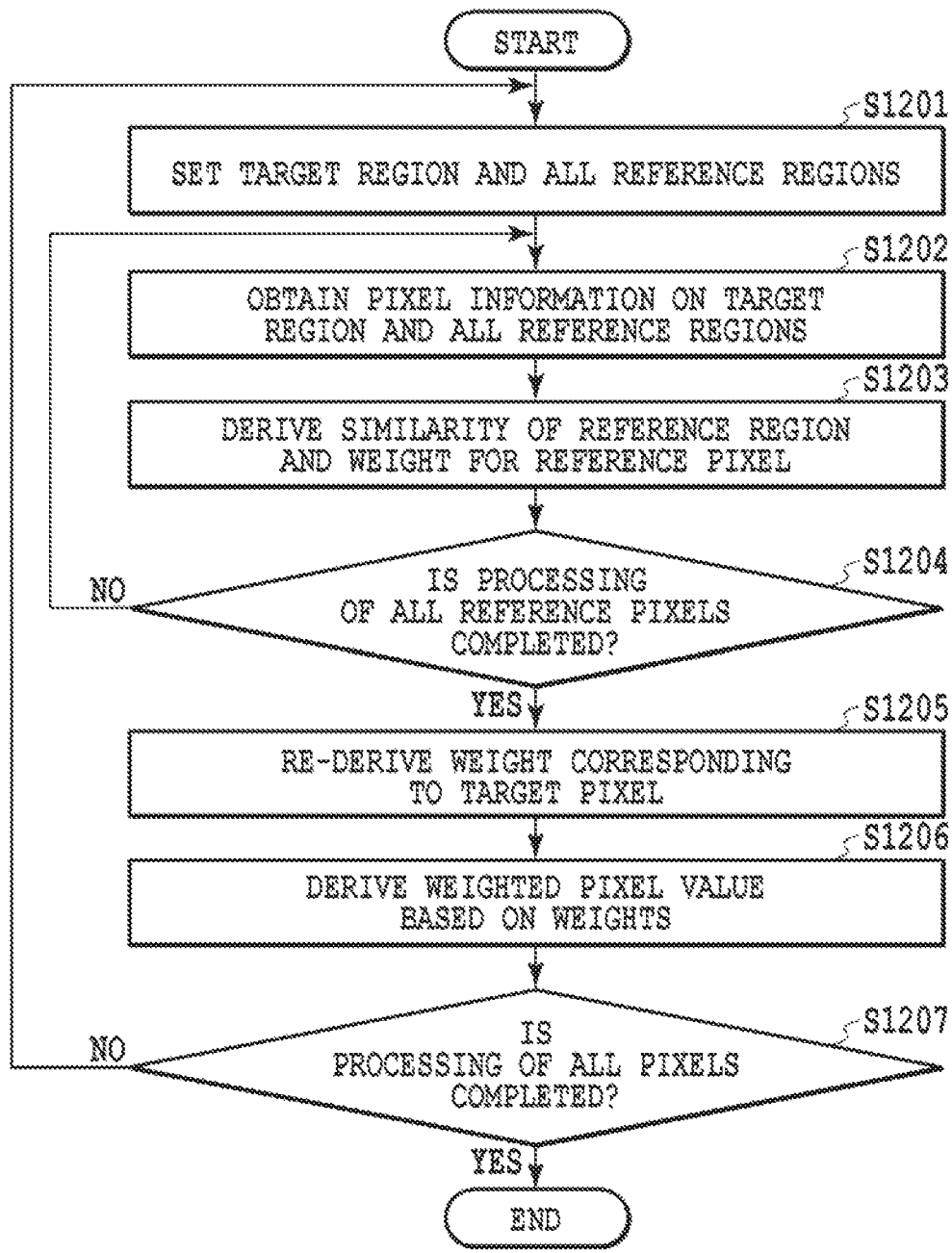
FIG. 12 is a flowchart illustrating a flow of processing of the fourth embodiment.

FIG. 12 is the flowchart illustrating a flow of processing by the image processing apparatus illustrated in FIG. 11. The processing illustrated in FIG. 12 is implemented by the CPU 101 executing the programs stored in the RAM 102 and thereby causing the programs to function as the processing units illustrated in FIG. 11.

At step S1201, first, the target region/reference region setting unit 1101 sets a target pixel and a region around the target pixel as a target region, and further sets plural reference pixels to be referred to, and regions around the plural reference pixels, as plural reference regions. In the fourth embodiment, one of the reference regions is the same region as the target region. The reference region which is the same as the target region is set so that the reference region can be easily identified, for example by determining a memory which stores a value.

At step S1202, the similarity/weight derivation unit 1102 obtains pixel information containing pixel values and pixel positions of the target region and all reference regions. At step S1203, the similarity/weight derivation unit 1102 derives similarity of each reference region to the target region, and a weight for each reference region. Here, one of the reference regions is the target region itself. At step S1204, the similarity/weight derivation unit 1102 determines whether an unprocessed reference pixel is present, and the similarity/weight derivation unit 1102 repeats the processing of step S1203 until the processing is finished for all reference pixels.

Then, at step S1205, the target pixel weight re-derivation unit 1103 re-derives a weight for the reference region which is the same region as the target region. At this time, a suitable value for a weight for the target pixel, rather than a value which is extremely large relative to weights for other reference pixels, is derived as described for the first to third embodiments. For example, the weight may be replaced with a predetermined value.

At step S1206, the weighted mean derivation unit 1104 derives a weighted mean based on the weights obtained before and at step S1205, and derives the weighted mean as a pixel value of an output image.

Finally, at step S1207, the image processing apparatus determines whether the processing of all pixels is completed; in a case where the processing is not completed, the processing returns to step S1201, while on the other hand, in a case where the processing is completed, the processing comes to an end. An output image subjected to the noise reduction processing is obtained by a series of processing operations described above.

In the fourth embodiment, as described above, even if the reference region is the same region as the target region, a weight is derived in the same manner, and thereafter, a weight for a reference pixel of the reference region which is the same region as the target region is re-derived. This enables avoiding the problem of a weight for a target pixel becoming extremely heavy, and thus enables obtaining statistically a better image than hitherto. Incidentally, in the fourth embodiment, mention is made of a weight re-derivation method; however, the same processing may be performed in the process of derivation of a weighted mean. Specifically, the same effect can be achieved even with a method in which, at the time of derivation of the weighted mean, the product of the pixel value of the reference pixel which is the same as the target pixel and the weight is calculated, and thereafter, the calculated value is re-derived as a proper value. For example, a method for re-deriving the calculated value as the proper value may replace (or overwrite) the calculated value with a predetermined value in consideration for respects as described for the above-mentioned embodiments.

As described for the above embodiments, in the approach of the present invention, the weight in a case where the same region as the target region is set as the reference region is set relatively smaller than hitherto. This enables obtaining a good image which achieves both reduction in noise caused by the fact that the weight in a case where the same region as the target region is set as the reference region is too heavy, and edge retention.

Incidentally, in the first to third embodiments, description has been given using consistently the sum of the squares of the difference as the similarity between the reference region and the target region; however, the present invention is not limited to using the sum of the squares of the difference to evaluate the similarity. The first and fourth embodiments can be carried out without depending on a specific similarity evaluation method. In the second embodiment, it is necessary to see in advance the similarity in a case where the same region as the target region is set as the reference region; however, this is possible at any time, provided that the similarity is defined, and thus, the second embodiment does not depend on the specific similarity evaluation method. In the third embodiment, the threshold value for the similarity or the weight is necessary in order to determine whether the target pixel is used as the reference pixel; however, the third embodiment does not depend on the specific similarity evaluation method. Various evaluations such as the sum of the absolute values of the difference, the product of the ratios between the pixel values, and the sum of the ratios between the pixel values can be considered as similarity evaluations other than the sum of the squares of the difference. For any of these evaluations, theoretical calculations (including numerical calculations by a computer) of what value is likely in a case where the signal components match each other are always possible, and thus, the threshold value can be determined in advance. Also, even if the threshold value is not theoretically determined, the threshold value can be empirically set by processing many images. Therefore, any of the first to fourth embodiments is not limited to using the sum of the squares of the difference to evaluate the similarity.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus for executing noise reduction processing on image data, the image processing apparatus comprising:
   at least one of:
      one or more circuits; or
      one or more processors and at least one memory, the at least one memory being coupled to the one or more processors and having stored thereon instructions executable by the one or more processors,
   wherein at least one of the one or more circuits or execution of the instructions cause the image processing apparatus to function as:
      a processing unit configured to:
         receive image data;
         perform noise reduction processing on the image data by:
            selecting a target pixel in the image data; and
            determining a value to be calculated using pixel values of pixels and a weight corresponding to each of the pixels as a pixel value of the target pixel; and
         generate an output image based on the noise reduction processing performed on the image data; and
      an output unit configured to output the output image,
   wherein, the weights for calculating the pixel value of the target pixel in the image data meet a condition that a weight of a pixel corresponding to a region of pixel values which matches pixel values of a target region associated with the target pixel is not a max value among the weights.

2. The image processing apparatus according to claim 1, wherein the processing unit sets a weight for the target pixel among the weights for calculating the pixel value of the target pixel in the image data as a predetermined value, and
   wherein, a weight for a pixel near the target pixel is determined based on a similarity between the target region and a region associated with the pixel near the target pixel.

3. The image processing apparatus according to claim 2, wherein the predetermined value is 0.

4. The image processing apparatus according to claim 2, wherein the processing unit holds the weight for the target pixel in advance.

5. The image processing apparatus according to claim 2, wherein the processing unit derives a sum of squares of a difference of the pixel values between the target region and the region associated with the pixel near the target pixel as the similarity, for each of the pixels near the target pixel, for calculating the pixel value of the target pixel in the image data.

6. The image processing apparatus according to claim 1, wherein the processing unit performs weighted mean processing by using pixel values of pixels other than the target pixel and weights for the pixels other than the target pixel in order to calculate the pixel value of the target pixel in the image data, and wherein, the weighted mean processing is performed without using the pixel value of the target pixel.

7. The image processing apparatus according to claim 1, wherein the processing unit:

sets sequentially each of the target pixel and pixels near the target pixel as a reference pixel;

determines weights for each of the reference pixels based on a similarity between the target region and a reference region associated with each of the reference pixels; and replaces a weight calculated for the target pixel with a predetermined value.

8. An image processing method for executing noise reduction processing on image data, the image processing method comprising:

receiving image data;

performing noise reduction processing on the image data by:

selecting a target pixel in the image data; and determining a value to be calculated using pixel values of pixels and a weight corresponding to each of the pixels as a pixel value of the target pixel; and generating an output image based on the noise reduction processing performed on the image data; and outputting the output image, wherein, the weights for calculating the pixel value of the target pixel in the image data meet a condition that a weight of a pixel corresponding to a region of pixel values which matches pixel values of a target region associated with the target pixel is not a max value among the weights.

9. A non-transitory computer readable storage medium storing a program for causing a computer to perform an image processing method for executing noise reduction processing on image data, the program including instructions which, when executed by a processor, cause the computer to:

receive image data;

perform noise reduction processing on the image data by:

selecting a target pixel in the image data; and determining a value to be calculated using pixel values of pixels and a weight corresponding to each of the pixels as a pixel value of the target pixel; and generate an output image based on the noise reduction processing performed on the image data; and output the output image, wherein, the weights for calculating the pixel value of the target pixel in the image data meet a condition that a weight of a pixel corresponding to a region of pixel values which matches pixel values of a target region associated with the target pixel is not a max value among the weights.

\* \* \* \* \*